United States Patent
Daniel

(10) Patent No.: US 8,291,386 B2
(45) Date of Patent: Oct. 16, 2012

(54) SYSTEM AND PROCESS FOR DEBUGGING OBJECT-ORIENTED PROGRAMMING CODE

(75) Inventor: Maxime Daniel, Besné (FR)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 12/247,083

(22) Filed: Oct. 7, 2008

(65) Prior Publication Data

US 2010/0050157 A1    Feb. 25, 2010

(30) Foreign Application Priority Data

Aug. 21, 2008 (EP) .................................... 08305491

(51) Int. Cl.
*G06F 9/44* (2006.01)

(52) U.S. Cl. .......................... 717/125; 717/124; 717/116

(58) Field of Classification Search .................. None
See application file for complete search history.

(56) References Cited

U.S. PATENT DOCUMENTS

| | | | |
|---|---|---|---|
| 5,361,351 A | 11/1994 | Lenkov et al. | |
| 5,371,747 A | 12/1994 | Brooks et al. | |
| 5,446,900 A | 8/1995 | Kimelman | |
| 5,740,440 A * | 4/1998 | West | 717/125 |
| 5,758,122 A * | 5/1998 | Corda et al. | 717/125 |
| 5,956,479 A * | 9/1999 | McInerney et al. | 714/38.13 |
| 6,131,185 A * | 10/2000 | Coskun et al. | 717/129 |
| 6,182,186 B1 * | 1/2001 | Daynes | 710/200 |
| 6,240,545 B1 * | 5/2001 | Carmichael et al. | 717/128 |
| 6,353,923 B1 | 3/2002 | Bogle et al. | |
| 6,611,844 B1 * | 8/2003 | Saulpaugh et al. | 1/1 |
| 6,654,951 B1 * | 11/2003 | Bacon et al. | 717/154 |
| 6,668,370 B1 | 12/2003 | Harmon et al. | |
| 6,728,949 B1 * | 4/2004 | Bryant et al. | 717/127 |
| 6,826,746 B2 | 11/2004 | Evans et al. | |
| 6,957,422 B2 * | 10/2005 | Hunt | 717/130 |
| 7,260,217 B1 * | 8/2007 | Carlson | 380/37 |
| 7,434,205 B1 * | 10/2008 | Steenhagen et al. | 717/124 |
| 7,441,233 B1 * | 10/2008 | Orndorff et al. | 717/125 |

(Continued)

FOREIGN PATENT DOCUMENTS

EP    0476635 A2    3/1992

(Continued)

OTHER PUBLICATIONS

Title: Low-overhead interactive debugging via dynamic instrumentation with DISE, author: Corliss, M.L et al, dated: 2005, source: IEEE.*

(Continued)

*Primary Examiner* — Chameli Das
(74) *Attorney, Agent, or Firm* — Kenneth L. Sherman, Esq.; Michael Zarrabian, Esq.; Sherman & Zarrabian LLP

(57) ABSTRACT

A process and system for interactive debugging of a computer program, is provided. One implementation involves providing a class for an object oriented computer program capable of executing on a computer system, the class having class methods defining a semantic field of the class; automatically monitoring the class during execution of the program, and leveraging said class methods by executing the class methods upon object-typed variables to obtain a pseudo-field value; and presenting the pseudo-field value along with fields of the said object-typed variables, on a user interface for debugging purposes.

20 Claims, 6 Drawing Sheets

U.S. PATENT DOCUMENTS

| | | | |
|---|---|---|---|
| 7,546,578 B2 * | 6/2009 | Yang | 717/108 |
| 7,685,581 B2 * | 3/2010 | Plesko et al. | 717/146 |
| 7,743,367 B1 * | 6/2010 | Nikolov et al. | 717/148 |
| 7,882,492 B2 | 2/2011 | Viswanadha et al. | |
| 7,886,272 B1 * | 2/2011 | Episkopos et al. | 717/124 |
| 7,908,020 B2 * | 3/2011 | Pieronek | 700/19 |
| 8,141,036 B2 | 3/2012 | Wagner et al. | |
| 2003/0229529 A1 * | 12/2003 | Mui et al. | 705/8 |
| 2006/0004558 A1 * | 1/2006 | Bankes | 703/22 |
| 2008/0134161 A1 * | 6/2008 | Chamieh et al. | 717/166 |
| 2009/0150864 A1 * | 6/2009 | Meijer et al. | 717/116 |
| 2010/0050158 A1 | 2/2010 | Daniel | |
| 2010/0050159 A1 | 2/2010 | Daniel | |

FOREIGN PATENT DOCUMENTS

| | | | |
|---|---|---|---|
| JP | 62028846 A2 | 2/1987 | |
| JP | 04257033 A2 | 9/1992 | |
| JP | 2003150405 A1 | 5/2003 | |

OTHER PUBLICATIONS

Title: An Interactive Debugging Environment, author: van der Linden, F et al, source: IEEE, dated: 1985.*

Java Se, Java Platform Debugger Architecture, located at http://java.sun.com/javase/technologies/core/toolsapis/jpda/, downloaded Sep. 30, 2008.

James Gosling, et al., The Java Language Specification, Third Edition, May 2005, 684 pages, Addison-Wesley.

Eclipse, "About the Eclipse Foundation", located at http://www.eclipse.org/org, downloaded Sep. 30, 2008.

Eclipse online help on Running and Debugging, located at http://help.eclipse.org/ganymede/advanced/print.jsp?topic=/org.eclipse. . . , Mar. 10, 2008, pp. 1-24.

Chris Aniszczyk et al., "Debugging with the Eclipse Platform," May 1, 2007, pp. 1-8, located at http://www.ibm.com/developerworks/java/library/os-ecbug/.

Holmgren, A., "Using Annotations to add Validity Constraints to JavaBeans Properties," located at http://java.sun.com/developer/technicalArticles/J2SE/constraints/annotations.html, Mar. 2005, 17 pages, Sun Microsystems, United States.

Austin, C., "J2SE 5.0 in a Nutshell," located at http://java.sun.com/developer/technical/Articles/releases/j2se15/, May 2004, 9 pages, Sun Microsystems, United States.

Jamae, J. "Learn to Use the New Annotation Feature of Java 5.0," retrieved from http://web.archive.org/web/20050213032009/http://www.dev.com/Java/Article/27235/1954, 2005, 6 pages, Jupitermedia Corporation, United States.

U.S. Non-Final Office Action for U.S. Appl. No. 12/247,092 mailed on Mar. 23, 2012.

U.S. Non-Final Office Action for U.S. Appl. No. 12/247,118 mailed on Feb. 29, 2012.

Srinivasan, S. et al., "Kilim: Isolation-Typed Actors for Java," Proceedings of the 22nd European Conference on Object-Oriented Programming (ECOOP '08), 2008, pp. 104-128, Springer-Verlag Berlin, Heidelberg, Germany.

U.S. Final Office Action for U.S. Appl. No. 12/247,118 mailed on Jul. 31, 2012 by Examiner Ted T. Vo.

* cited by examiner

SYSTEM AND PROCESS FOR DEBUGGING OBJECT-ORIENTED PROGRAMMING CODE

CROSS-REFERENCE TO RELATED APPLICATIONS

This application claims priority of EP08305491, filed on Aug. 21, 2008.

BACKGROUND OF THE INVENTION

1. Field of the Invention

The present invention relates generally to software program debugging tools and more particularly to software debugging tools for object-oriented software programs.

2. Background Information

In existing software debugging tools (debuggers), while debugging applications written in object-oriented (OO) programming languages, objects are presented into a debugger according to their structure, that is, the fields that their class define. This requires that the fields cleanly map the semantics of the objects. However, frequently a class defines parts (or whole) of its semantics through methods, while its fields mostly map to implementation details that may or may not help the developer depending on his focus on the class or classes that use it, and his level of knowledge of the class internals. In certain cases the developer intimately knows the class, but the class implementation, for performance reasons or otherwise, encodes its semantics in very difficult to understand fields.

SUMMARY OF THE INVENTION

The invention provides a process and system for interactive debugging of a computer program. One embodiment involves providing a class for an object oriented computer program capable of executing on a computer system, the class having class methods defining a semantic field of the class; automatically monitoring the class during execution of the program, and leveraging said class methods by executing the class methods upon object-typed variables to obtain a pseudo-field value; and presenting the pseudo-field value along with fields of the said object-typed variables, on a user interface for debugging purposes.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a system and process for debugging object oriented programs (code) by leveraging all methods that have no parameters and returning a value. Certain methods of the class under test have defining semantic fields of the class, wherein a debugger according to the invention recognizes and leverages those methods at debug time. In object oriented programming, a class is template for creating objects, and defines attributes (e.g., name, value) and methods (e.g., associated subroutines, functions, behaviors) of each object.

Figure 1:
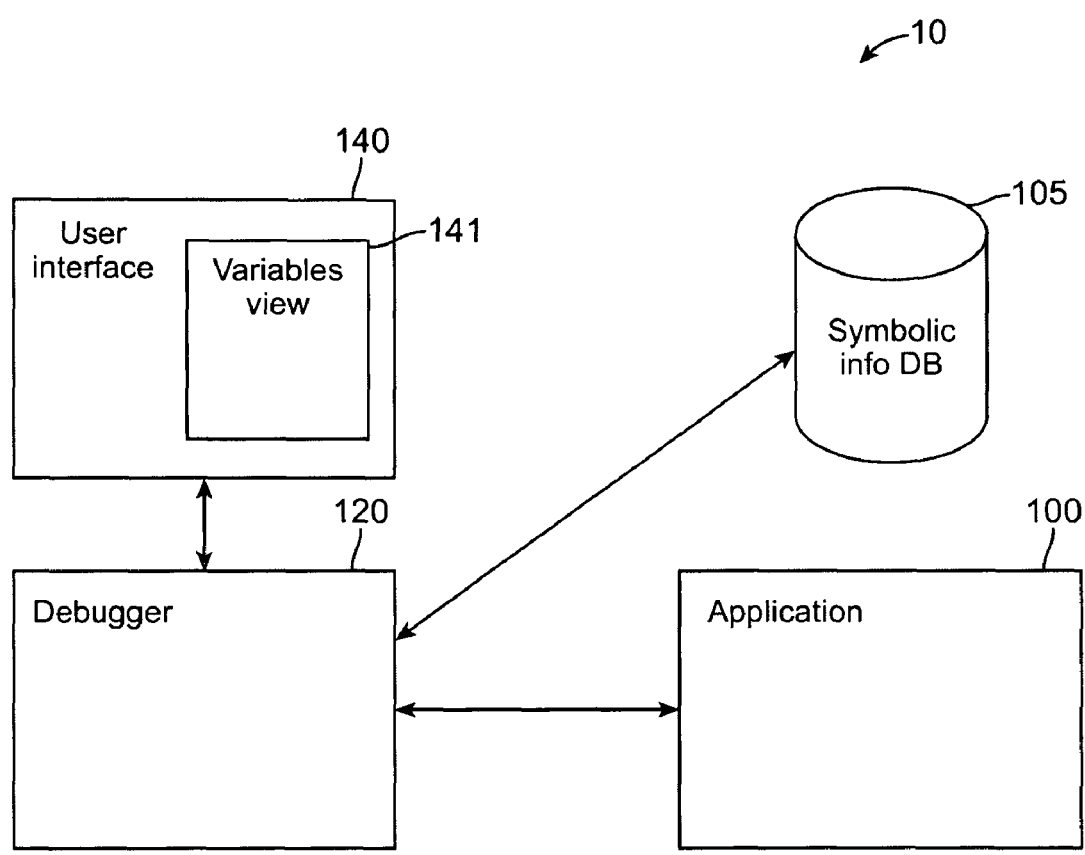
FIG. 1 shows a functional block diagram of a computing system implementing an embodiment of the invention.

FIG. 1 shows a functional block diagram of a computer system 10 in which an embodiment of the invention is implemented. Said embodiment of the invention is applicable to debugging (e.g., testing and solving programming issues such as errors) of objected oriented programs using a graphical user interface (GUI) debugger. A full-fledged graphical windowing system is not required, and character-based interfaces may be used, provided that information can be presented to the user (e.g., software developer/programmer) in a multi-views and multi-lines format.

The debugging computer system provides a debugging session, wherein an object oriented software application 100 is running on a computing system. The application 100, at the moments in time that are of interest to debugging, runs (executes) under the control of a debugger 120 (e.g., a software module). The application 100 may run on a computer-based system that may include a single machine that comprises a single core processor, or a networked system that comprises multiple machines, some of which include a single processor or some of which include multiple processors, etc.

The debugging computer system further includes database 105 of symbolic information about the application 100 under test. The database 105 may include various structures, use diverse storage technologies, be packaged with the executable components of the application 100, etc. The debugger 120 is configured to query information in the database 105 about the application 100, at the level of detail needed to implement its base debugging functions and implement debugging functions according to the invention.

In one implementation, the debugger 120 comprises a specialized software module configured to control execution of the application 100 under test, and to provide the user of the debugger 120 with tools to diagnose the execution of the application 100 from multiple points of view. The debugger 120 further interacts with the application 100 to selectively interrupt execution of one or more process threads of the application 100 at precise points in time depending on specific conditions. As such, the debugger 120 controls execution of the application 100 on behalf of the user, leverages the symbolic information 105 to provide debugging functions, and interacts with the user via a user interface module 140.

The user interface module 140 is configured to enable the user to interact with the debugger 120 and control execution of the application 100, and to diagnose the behavior of the application 100. The user interface 140 provides several views and dialogs, that may leverage a graphical user interface or rely upon character-based multi-line views and dialogs. Said views and dialogs provides controls (e.g., interfaces) to at least present the user with breakpoints which are points at which the execution of one or more threads of the application 100 can be interrupted. Said views may also provide controls to resume the execution of the application 100 in various manners (e.g., step by step, up to the following breakpoint, etc.).

Preferably, said views further include a view 141 which, for a given moment in time at which a given thread of the application 100 is stopped at a given point in the executable code of the application, presents the user with the variables that are in context. Such variable values are in memory and the application 100 typically uses their addresses to fetch them. The debugger 120 leverages the symbolic information database 105 to fetch types, etc.

The view 141 provides controls for filtering part of the available information, and, for presenting variables that are not of elementary types via means that makes this practical within a finite view (i.e., types more complex than simple types of a considered programming language such as int and other integral types, chars, strings of chars, booleans, etc.).

The view 141 also provides controls for the user to choose how much of the internal presentation structure of the view should be displayed. It is important to consider the relationship between the view 141 and structured variables (e.g., objects, and depending on the programming language, other structures that are supported by dedicated language features, such as arrays, tuples, etc.). A typical object, or class instance, may have many fields. Some of these fields can be objects, or even of the type of the considered object itself. The view 141 provides controls for the user to focus on presenting a subpart of the available information as desired.

For example, the view 141 may provide controls such as scrolling controls for a windowing system wherein the information is presented into what may be considered as an infinite view, a small part of which is presented to the user on a display and scroll bars are provided to move up or down parts of the available information.

Another control of the view 141 includes presenting information using a tree (hierarchical) metaphor, wherein only digging deeper into the tree the user can view further information. For example, having a JAVA® (Java is a trademark of Sun Microsystems, Inc. in the United States and foreign counties) class X {int i; X next;} at hand, the three metaphor would involve presenting the user with only the following view:

+this=X at 000fff where the + is in fact a control that enables the user to instruct the view 141 to expand the tree; doing so could, for a given execution of the application, result into:

−this=X at 000fff i=0

+next=X at 000fff.

Another control of the view 141 includes filters that leverage properties that are more related (e.g., field visibility, inherited fields, etc.) or less related (e.g., field name, name matching a regular expression, etc.) to the semantics of the programming language used by the application 100.

Figure 2:
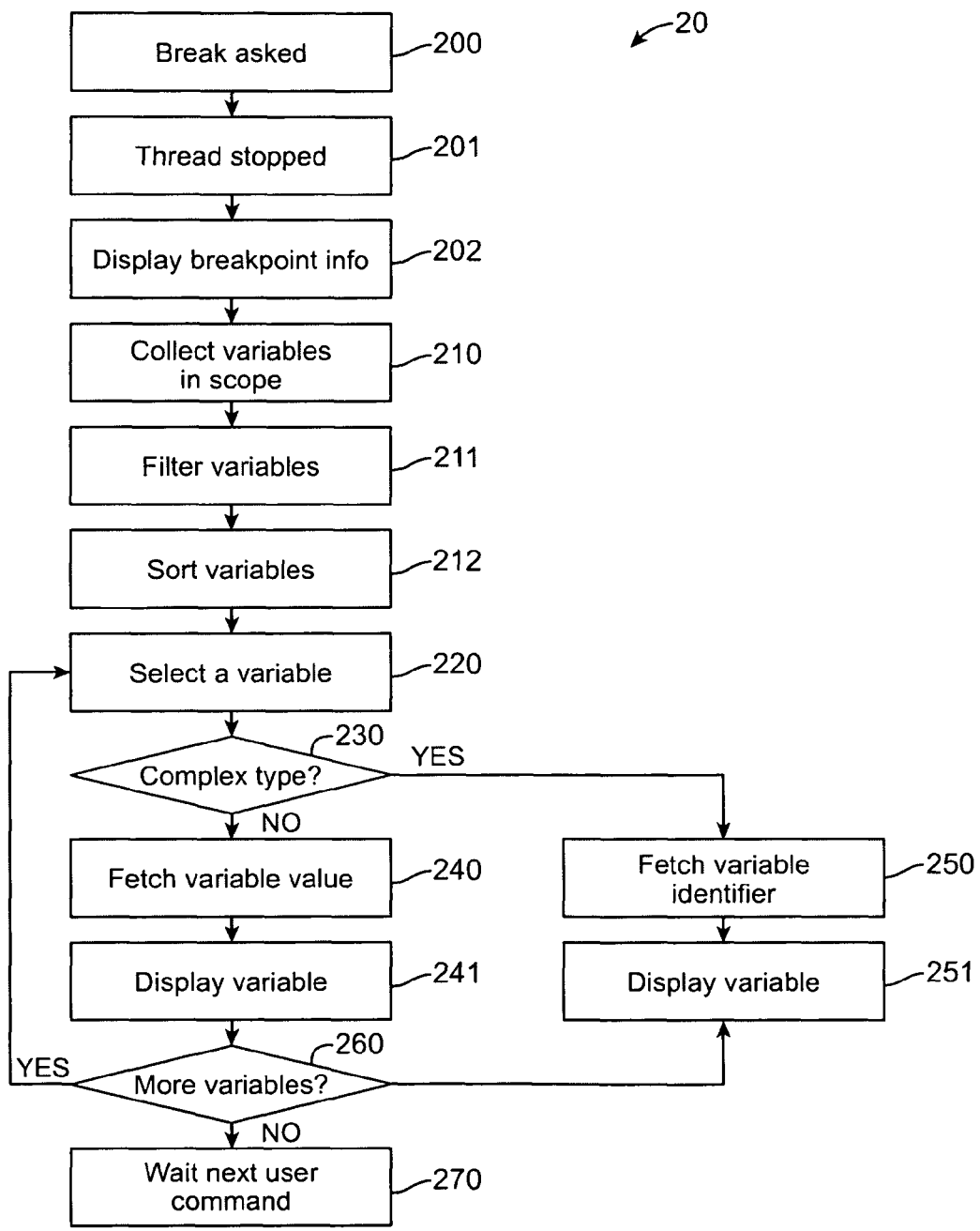
FIGS. 2-5 show flowcharts of a debugging process, according to an embodiment of the invention.

Other controls for the view 141 provides strategies for rendering information on a display for the user may also be implemented. Such strategies may also be combined. The rendering presented in the above examples are eventually subject to various embodiments of the debugger 120. The operation of an example debugger 120 may rely upon one or more processes described below, as described in relation to FIGS. 2-6. Only methods that have a suitable signature can be used (i.e., methods defining semantic fields). Such methods present pseudo-field values along with fields of object-typed variables on a user interface for debugging purposes, FIG. 2 shows an example process 20 according to which the debugger 120 presents a user with the information available at a given breakpoint in execution of the application 100. At block 200 a break in the execution of the application 100 is requested (e.g., via the user interface 140 or from an internal condition monitored by the debugger 120). The break can affect one or more threads of the application 100. At block 201, one or more of the threads are stopped by the debugger 120. At block 202, using the interface 140 the debugger 120 presents the user with information about the current point of execution of the application 100. At block 210 the debugger collects the variables that are in scope at the current point of execution. At block 211, optionally the debugger 120 filters out some of the variables based on various criteria, and only retain the remaining for presentation. At block 212, optionally the debugger 120 sorts the variables according to sorting criteria associated with the view or the debugger itself. At block 220, the debugger 120 selects the first variable in scope and removes it from the list of variables to handle. At block 230, if the variable is of complex type, then the process proceeds to block 250, otherwise the process proceeds in sequence to block 240.

At block 240, since the variable is of simple type, the debugger 120 fetches the value of that variable, which depending on the runtime environment may involve various techniques. For a compiled language such as C++, this would involve computing the memory address and size of the variable, then interpreting the resulting memory chunk according to the variable type. For an interpreted language like JAVA® in which a virtual machine is equipped with dedicated application programming interfaces (APIs) to do so, this would involve communicating with the virtual machine through the appropriate API to obtain the value.

At block 241, the debugger 120 presents information about said variable into the view 141 and the process proceeds to block 260. The information displayed may include the type, name and value of the said variable (other information about said variable may also be displayed).

At block 260, if additional variables remain in scope that have not been presented yet, the process loops back to block 220, otherwise the process proceeds to block 270 for completion, and the debugger 120 awaits a next command.

At block 250, referenced above, since said variable is of complex type, the debugger 120 fetches an identifier for the variable (e.g., memory address of the variable, or any other value guaranteed to identify the variable). At block 251, the debugger presents information about the variable into the view 141, and the process proceeds to block 260. The display of information about the variable in view 141 may include the type, name and identifier of the variable. The user is also enabled to request the details of the variable value, which may involve explicit graphics (e.g., when a click-able plus sign is provided) or may not involve explicit graphics (e.g., the user utilizes a contextual menu). The information presented may include (automatically or on demand) the string representation of the variable (e.g., in JAVA®, this would result from the call of the toString( ) method upon the object, since all classes ultimately inherit from Object).

According to the present invention, the debugger further presents in the view 141 the result of the execution of eligible methods upon object-typed variables, along with the (true) fields of the said variables. Whenever fields of an object type are considered, for all methods that have a return type and do not take parameters, the process involves deriving a pseudo-field name from the method name, running the method to obtain a pseudo-field value, and leveraging those names and values as if they were the names and values of a regular field.

Figure 3:
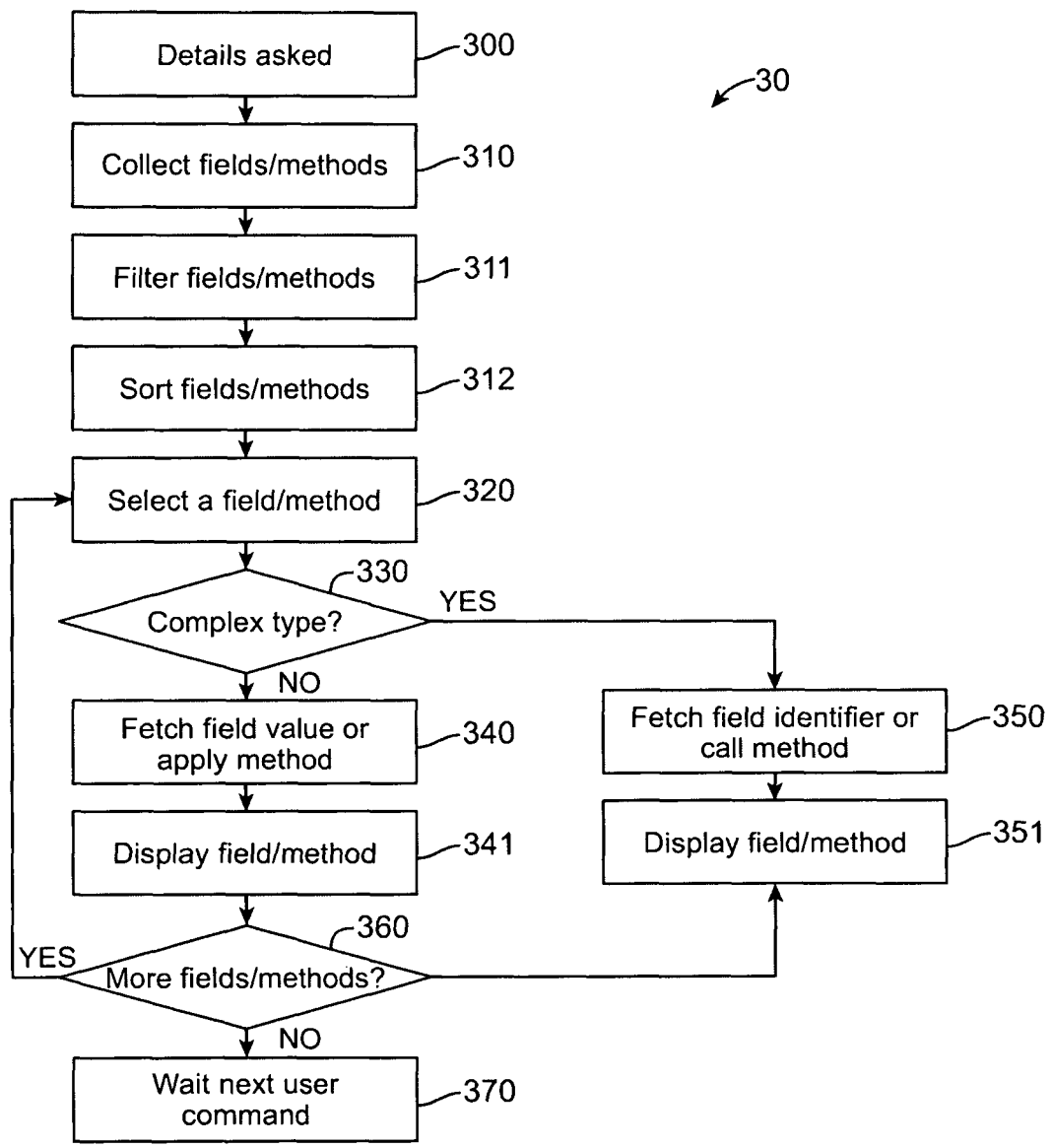

FIG. 3 shows an example process 30 according to which the debugger 120 presents a user with the details of a complex variable. At block 300 the user interacts with the debugger to request that the details of a complex variable that is in context to be presented. An example interaction would be for the user interacting with the variable as presented in view 141 by clicking the plus sign at its left, using a contextual menu upon it.

At block 310, the debugger 120 interacts with the symbolic information 105 to determine the names and types of the fields of the variable and to elaborate a list of all methods that can be called upon the variable, said methods having no parameter and return a value. For each of those methods, the debugger remembers its name and its return type. Optionally, the debugger associates a short name to each method, deriving that short name from the method name using rules (e.g., method "getName" may be associated to name "name" by a rule "strip leading get and lowercase leading letter"), and uses the resulting short names for sorting in block 312 further below.

At block 311, optionally the debugger filters out some of the fields and methods based upon various criteria and only retain the remaining ones for presentation.

At block 312, optionally, the debugger sorts the collection of fields and methods according to sorting criteria associated with the view or the debugger itself. Depending on the sorting criteria, the fields and methods may be interleaved.

At block 320, the debugger selects the first field or method of the variable and removes it from the list of fields and variables to be considered.

At block 330, if the field or the method return value is of complex type, then the process proceeds to block 350, otherwise the process proceeds in sequence to block 340.

At block 340, if a field was obtained at block 320, the debugger 120 determines the value of the field for the considered variable. Depending on the runtime environment, this may involve various techniques (e.g., for a compiled language such as C++, this would involve computing the memory address and size of the field, then interpreting the resulting memory chunk according to the field type; for an interpreted language such as JAVA® in which a virtual machine is equipped with dedicated APIs to do so, this would involve communicating with the virtual machine through the appropriate API to obtain the value). If at block 320 a method was obtained, then in block 340 herein the debugger calls that method upon the variable at hand to get a value.

At block 341, if a field was obtained at block 320, then the debugger displays the field related information via the view 141, then proceeds to block 360. The information displayed may include the type, name, and value of the said field (other information may be displayed). If at block 320 a method was obtained, the debugger performs the same as for a field, using the name of the method or the short name associated to the method as if it was a field name, and the value computed at block 340 as a field value.

At block 350, if a field was obtained at block 320, then since the field is of complex type, the debugger fetches an identifier for the field (e.g., this can be its memory address, or any other value guaranteed to identify the field). If a method was obtained at 320, then at 350 the debugger calls that method upon the variable at hand to obtain any missing information (e.g., determine if the value is null or it points to a specific memory location).

At block 351, if a field was obtained at 320, then the debugger presents the field into the view 141, then the process proceeds to 360. The presentation of the field typically includes the type, name (if its enclosing type) and identifier of the field. The user is also enabled to request for the details of the field value. This may involve explicit graphics (e.g., when a click-able plus sign is provided) or may not involve explicit graphics (e.g., when a contextual menu is provided). The information that is presented may include (automatically or on demand, the string) representation of the field (e.g., in JAVA®, this would result from the call of the toString( ) method upon the object, since all classes ultimately inherit from Object). If a method was obtained at 320, then at 351 the debugger performs the same as for a field, using the name of the method or the short name associated to the method as if it was a field name, and the information computed at 350.

At block 360, if there are more fields or methods to handle for the considered complex variable, the process loops back to block 320, otherwise, the process proceeds to block 370 for completion and awaiting next commands.

Figure 4:
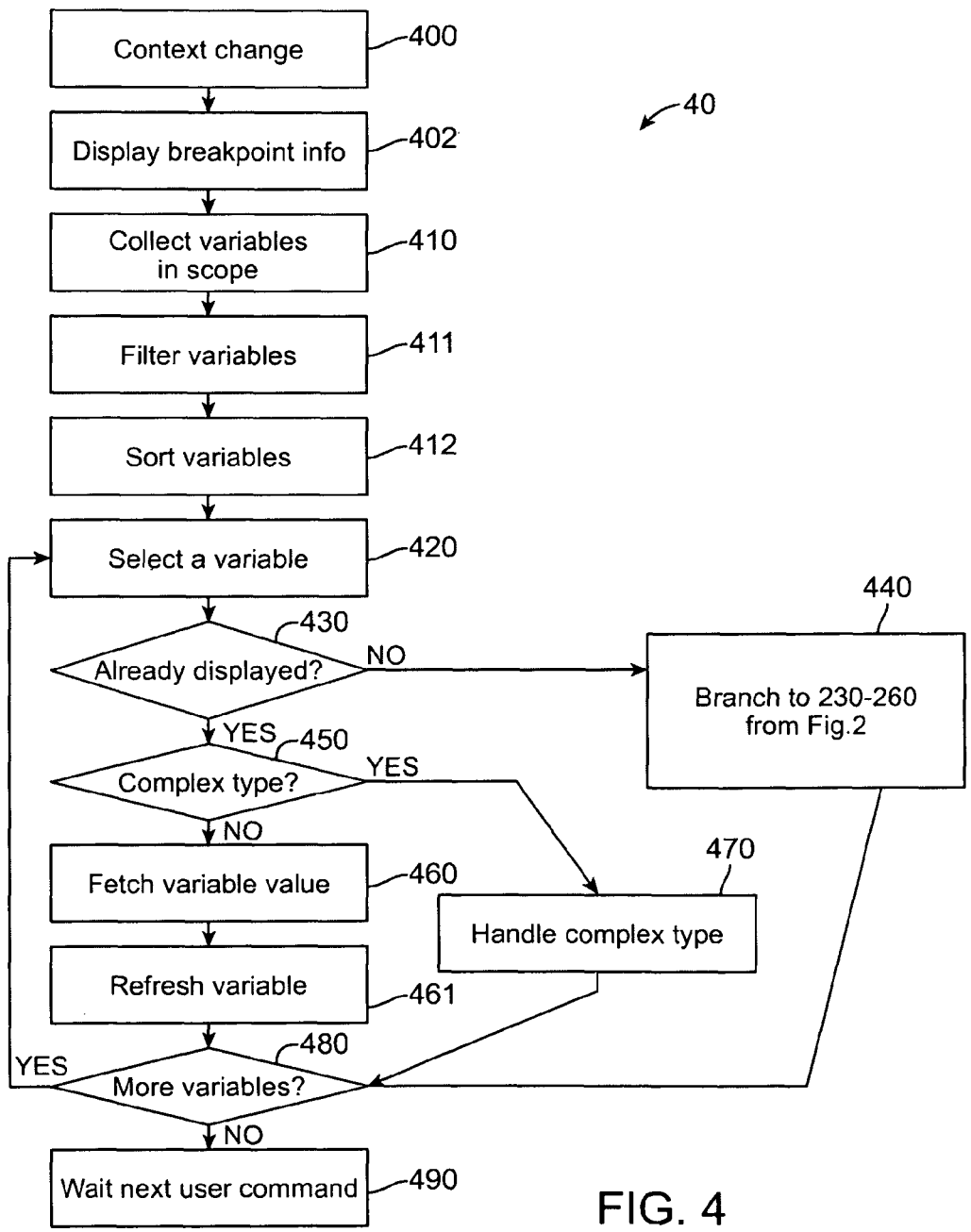

FIG. 4 shows an example process 40 according to which the debugger 120 refreshes the contents of the view 141. The variables in scope here include parameters (on the stack) and global variables (e.g., the static fields of selected classes in JAVA®). At block 400 the context changes. This may be as a result of stepping though the code of the application 100. Note that the current thread of the application 100 is still stopped, after having been resumed for the execution of one or more instructions. It is expected that if the user requested for the application 100 to resume and a breakpoint is reached, either that breakpoint is close enough from the former point in execution, or the process 20 of FIG. 2 is utilized instead of process 40.

At block 402, the debugger 120 presents the user in the user interface 140 with information about the current point of execution of the application 100. At block 410, the debugger collects the variables that are in scope at the current point of execution (again). At block 411, optionally the debugger filters out some of the variables, based upon various criteria, and only retains the remaining ones as needing to be presented. At block 412, optionally the debugger sorts the variables according to sorting associated with the view or the debugger itself. At block 420, the debugger 120 selects the first variable in scope and removes it from the list of variables to handle. At block 430 the debugger 120 tests whether the current variable was already displayed in view 141 or not. If not, the process proceeds to block 440, otherwise the process continues to block 450.

At block 440, the debugger 120 utilizes the process 20 of FIG. 2 starting at block 230 and ending before block 260, then branches to block 480 instead of 260 from block 241 and 251. In effect, the debugger handles the display of a variable that was not in scope at the former breakpoint.

At block 450, the variable being considered was already displayed in view 141, wherein the debugger 120 considers whether the variable is of complex type or not. If the variable is of complex type, the process branches to block 470, otherwise the process continues to block 460. At block 460, since the variable being considered is of simple type, the debugger fetches the values of the variable. At block 461, the debugger refreshes the variable display into the view 141, then proceeds to block 480. In one implementation, a brute-force approach is used to simply display the variable as if it had not been seen at the previous step. In another implementation, it is determined which variables may have changed, and which have not changed, and only the ones changed are refreshed.

At block 470, since the variable being considered is of complex type, it is refreshed accordingly (an example is described in conjunction with FIG. 5 further below). At block 480, if there are more variables in scope that have not been presented yet, the process loops back to block 420, otherwise the process proceeds to block 490 for completion and awaiting a next user command.

Figure 5:
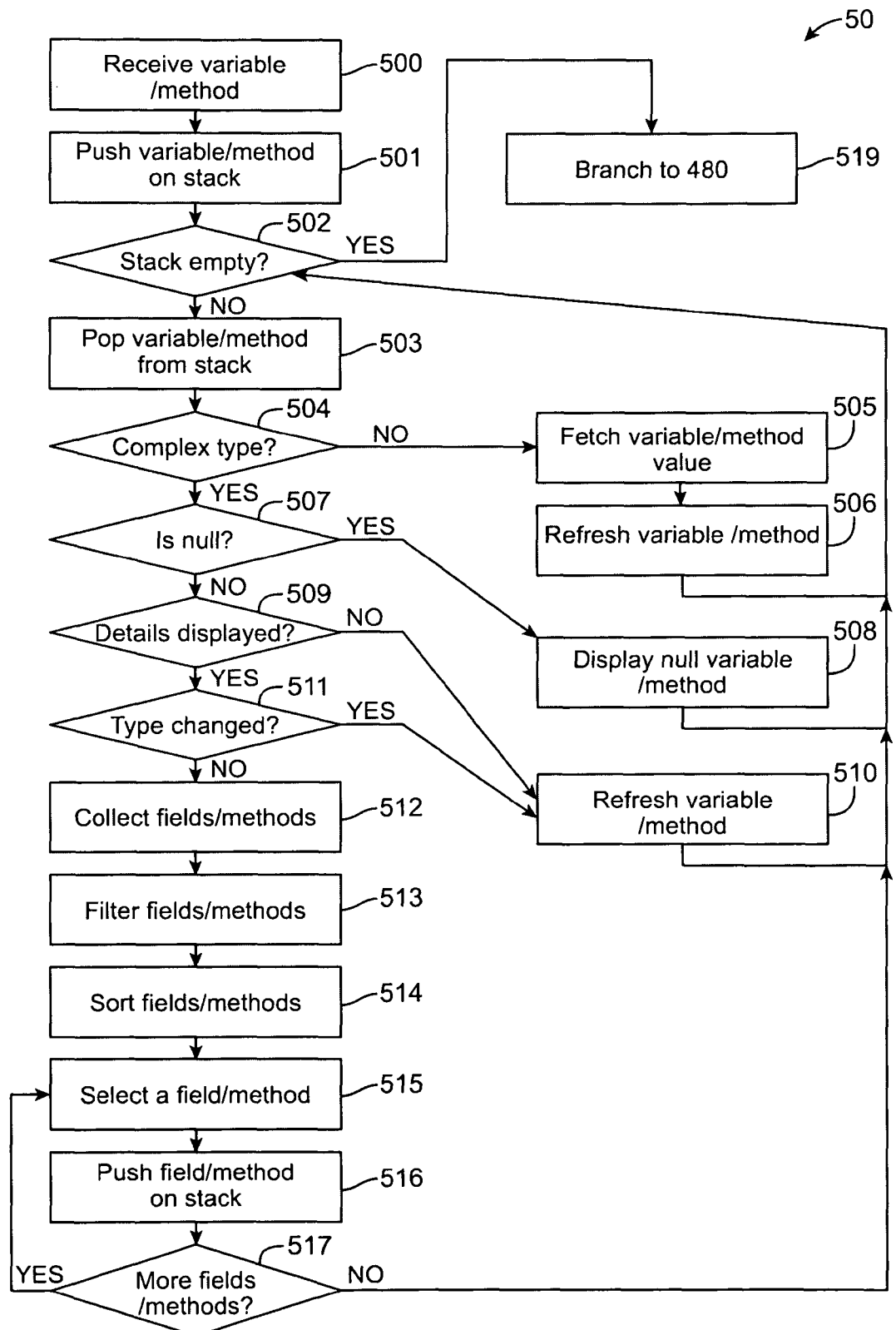

FIG. 5 shows an example process 50 according to which the debugger 120 refreshes display of a variable of complex type. The process 50 is inherently recursive, and generally involves matching the tree that represented the previous value of the variable with its current value, pruning dead branches as needed. The process 50 makes explicit use of a stack. At block 500, the process receives a variable of complex type from block 450 (FIG. 4). At block 501, the variable is pushed on the stack. At block 502, if the stack is empty, the process proceeds to block 519, otherwise the process proceeds to block 503. At block 503, a variable or method is popped from the stack. At block 504, if a popped variable is of complex type, the process proceeds to block 507, otherwise the process proceeds to block 505. At block 504, for a popped method, a short name is computed for the method as in block 310 (FIG. 3), and the debugger then calls the method on the variable at hand, as in block 340, to obtain a value, and passes the obtained name and value to subsequent process block(s). Blocks 505-519 are now described first in relation with variables and methods.

For variables

At block 505, since the variable is of simple type, the value of the variable is fetched. At block 506 the value of the variable is refreshed in the view 141, and the process proceeds to block 502. At block 507, since the variable is of complex type, it is checked against void (e.g. null in JAVA®, or 0 in C programming language). If the variable is void, the process proceeds to block 508, else the process proceeds to block 509.

At block 508, since the variable of complex type is void, it is displayed as such in the view 141 (this includes pruning the subtree that previously showed detailed values for the same variable at the previous breakpoint, if any). The process then proceeds to block 502.

At block 509, since a variable of complex type is non-void, it is checked if its details were displayed or not. If not, the process proceeds to block 510, otherwise the process proceeds to block 511.

At block 510, since a non-void variable of complex type was displayed without its details, or was displayed with details but changed its type, the display of its value is refreshed (e.g., display the same information as that in block 351 in FIG. 3). The process then proceeds to step 502.

At block 511, since a non-void variable of complex type was displayed with its details, it is checked if its type has changed or not. If yes, the process proceeds to block 510, else the process proceeds to block 512.

At block 512, since a non-void variable of complex type was displayed with its details and its type has not changed, its fields and suitable methods are collected. There are both real fields and semantic fields, as for any complex type variable or method result.

At block 513, optionally the debugger filters out some of the fields/methods, based upon various criteria, and only retains the remaining ones as needing to be presented.

At block 514, optionally the debugger sorts the fields/methods according to sorting criteria associated with the view or the debugger itself.

At block 515, the first field/methods that is still to be handled is selected and removed from the list of fields/methods to handle.

At block 516, the field/method is pushed onto the stack.

At block 517, if there are more fields/methods on the stack to handle, the process loops back to block 515, else the process loops back to block 502.

At block 519, the stack is empty and all visible variables have been refreshed, wherein the process proceeds to block 480 (FIG. 4).

For methods

Blocks 505-511 use the method name and return the value computed at block 503 as if they were the name and value of a field.

Block 512, collect fields and suitable methods.
Block 513 is applied to fields and methods.
Block 514 is applied to fields and methods.
Block 515 selects a field or a method.
Block 516 pushes a field or a method upon the stack.

Another example involves calling methods more sparingly. The debugger presents methods as special fields, and provides the user with controls to call them, either individually or batches at a time. There is a continuum of possible implementations ranging from systematic execution (described hereinabove) to the display of a "refresh" indicator close to each special field, which the user would have to click to obtain the corresponding value.

Embodiments of the present invention are applicable to all object programming languages that are equipped with debug-time runtime introspection, at least to the point of enabling the execution of methods which are selected at runtime. This includes at least most interpreted programming languages, certain semi-interpreted programming languages (e.g., JAVA®), and certain compiled programming languages. In the case of compiled programs, it is common practice to pass compiler specific options to produce a debug-enabled version of the executable application; that version carries sufficient information for the debugger to interpret memory and registers contents, and to modify the memory and registers contents with the effect of assigning new values to attributes or running methods of objects; this is not using introspection per se, but points to the same needed basic abilities, i.e., access to an object instance, access to its type description, read its attributes, execute its methods.

All methods that take no parameter and return a value are eligible for application of the present invention, and the debugger may apply matching and filtering rules to select certain methods (e.g., the debugger may be equipped with built-in or user-level matching rules such as "all instance methods whose name starts with get").

All the application code is elaborated in the context of normal programming, with the full support of the integrated development environment (IDE) chosen by the developer/user of the class under test. As noted, the developer should keep in mind that only methods that have a suitable signature can be used (i.e., methods defining semantic fields). However, even developers who may be unaware of the use of their classes by the invention, may equip their classes with a few, useful eligible methods for the benefit of the applications that use their classes. Their classes then are at least partially equipped for the invention without the developer even knowing it. The renderers are a true part of the class under in the application under test, and are managed with it from the source code management system point of view. The debugger is automatic from the standpoint of the class user. As such, once the developer of a class has equipped it properly with renderers (which can be implicit as explained above), users of the class can automatically use said renderings (e.g., view 141 in interface 140). In certain variants of the invention, user intervention may be received to refine program behaviors.

The invention only leverages the user code as it is written and can be readily adopted by diverse debuggers, without requiring sharing of knowledge about the debugger implementations. The invention can be reused with logging frameworks since the invention enables writing of rendering methods that are available with the code under test, wherein said methods can be reused for other debugging purposes, and especially logging. The invention further provides efficient encapsulation, wherein the effort of bridging the internals towards semantics is left with the class under test author, which is the most capable of doing so.

Figure 6:
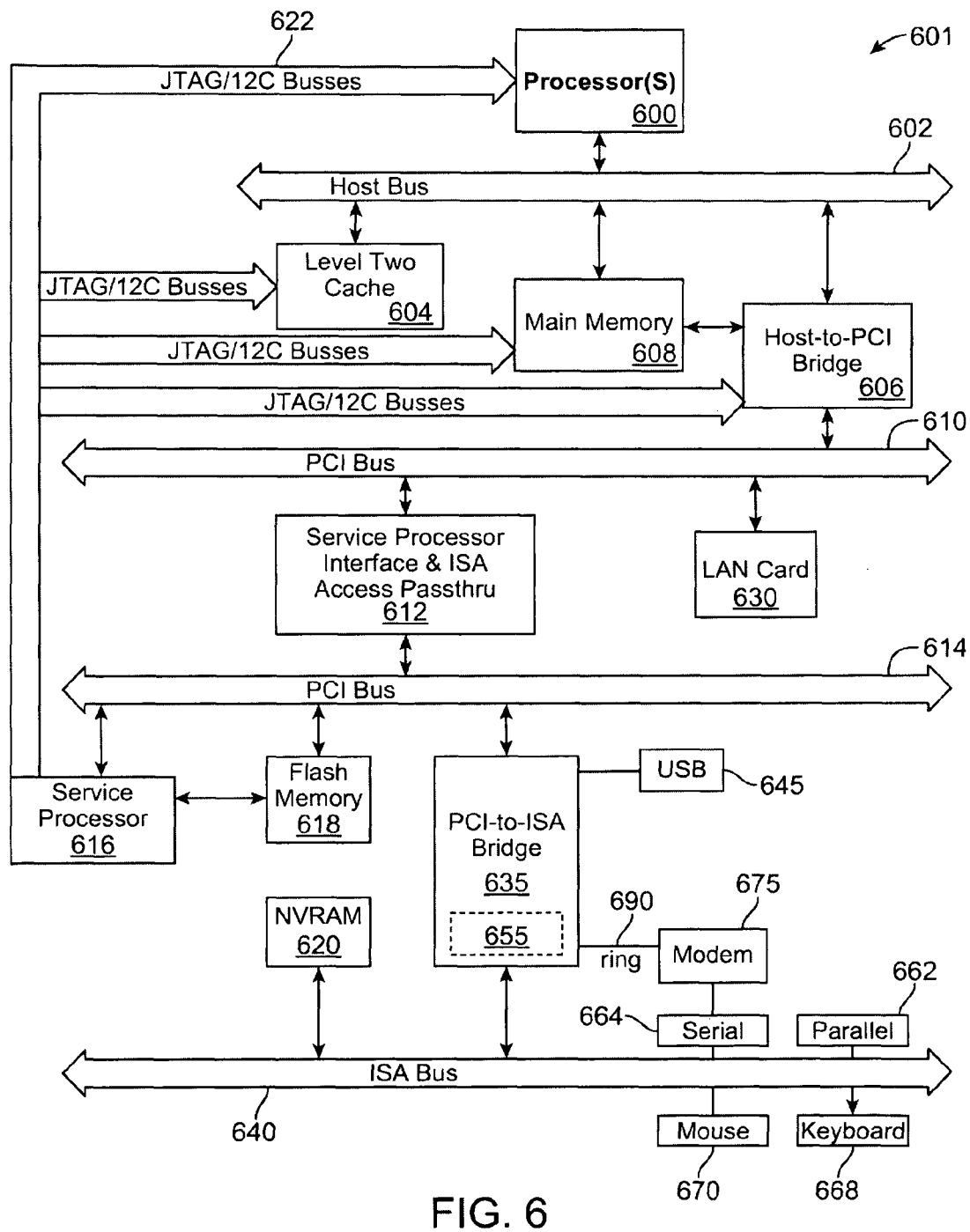
FIG. 6 shows an example computer system suitable for implementing the present invention.

FIG. 6 illustrates an information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640). Alternatively, many I/O devices can be accommodated by a super I/O controller (not shown) attached to ISA bus 640.

In order to attach the computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs having one or more processors are capable of performing the processes described herein.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof, however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of interactive debugging of a computer program, comprising:
   employing a hardware processor for providing a class for an object oriented computer program capable of executing on a computer system, the class having class methods defining a semantic field of the class;
   the hardware processor automatically monitoring the class during execution of the program, and leveraging said class methods by executing the class methods upon object-typed variables to obtain a pseudo-field value, wherein leveraging comprises deriving a pseudo-field name from a name of a class method, executing the class method by the hardware processor and obtaining a pseudo-field value associated with the derived pseudo-class name; and
   presenting the pseudo-field value along with true fields of the said object-typed variables, on a user interface for debugging purposes.

2. The method of claim 1 wherein leveraging said class methods further include:
   for variables of an object type, for all class methods that have a return type and do not take parameters, deriving a pseudo-field name from each class method name, executing the class method to obtain a pseudo-field value, and using the pseudo-field names and pseudo-field values as if they were the names and values of a regular field, wherein a class method comprises one or more of an associated subroutine and an associated function.

3. The method of claim 1 wherein the user interface includes a view for presenting relevant information to a user.

4. The method of claim 1 further including applying matching and/or filtering rules to select a class method for leveraging.

5. The method of claim 1 further including controlling execution of the computer program.

6. A system for interactive debugging of a computer program, comprising:
   a debugging module employing a hardware processor for monitoring a computer program executing on one or more processors, the computer program including a class having class methods defining a semantic field of the class;
   the debugging module including a leveraging function that leverages said class methods by executing the class methods upon object-typed variables to obtain a pseudo-field value, wherein a pseudo-field name is derived from a name of a class method, the class method is executed by the hardware processor and a pseudo-field value associated with the derived pseudo-class name is obtained; and a user interface module that presents the pseudo-field value along with true fields of the said object-typed variables, on a user interface for debugging purposes.

7. The system of claim 6 wherein the leveraging function is further configured such that:

for variables of an object type, for all class methods that have a return type and do not take parameters, the leveraging function derives a pseudo-field name from each class method name, executes the class method to obtain a pseudo-field value, and uses the derived pseudo-field names and pseudo-field values as if they were the names and values of a true field.

8. The system of claim 6 wherein the user interface includes a view for presenting relevant information to a user.

9. The system of claim 6 wherein the leveraging function applies matching and/or filtering rules to select a class method for leveraging.

10. The system of claim 6 wherein the debugging module controls execution of the computer program.

11. The system of claim 10 wherein the user interface module enables a user to interact with the debugging system and control execution of the computer program to diagnose the behavior of the computer program.

12. The system of claim 6 further including a database maintaining symbolic information about the computer program, wherein the debugging interacts with the symbolic information to determine the names and types of the fields of variables and to elaborate a list of all methods that can be called upon the variables, wherein the methods have no parameter and return a value.

13. A computer program product for interactive debugging of an application program, comprising a non-transitory computer readable medium strong a computer readable program, wherein the computer readable program when executed on a computer causes the computer to:

monitor the application program executing on one or more processors, the application program including a class having class methods defining a semantic field of the class;

leverage said class methods by executing the class methods upon object-typed variables to obtain a pseudo-field value, wherein a pseudo-field name is derived from a name of a class method, the class method is executed on the computer and a pseudo-field value associated with the derived pseudo-class name is obtained; and present information including the pseudo-field value along with true fields of the said object-typed variables, on a user interface for debugging.

14. The computer program product of claim 13 wherein leveraging said class method further causes the computer to:

for variables of an object type, for all class methods that have a return type and do not take parameters, derive a pseudo-field name from each class method name, execute the class method to obtain a pseudo-field value, and use the derived pseudo-field names and pseudo-field values as if they were the names and values of a true field.

15. The computer program product of claim 13 wherein said user interface includes a view for presenting relevant information to a user.

16. The computer program product of claim 13 wherein leveraging said class method further causes the computer to: apply matching and/or filtering rules to select a class method for leveraging.

17. The computer program product of claim 13 wherein the computer program further causes the computer to: control execution of the application program.

18. The computer program product of claim 13 wherein:

presenting information further causes the computer to: enable the user to interact with debugging of the application program, and control execution of the application program to diagnose the behavior of the application program.

19. The computer program product of claim 13 wherein the computer comprises one or more processors.

20. The computer program product of claim 13 further causing the computer to maintain a database of symbolic information about the application program, and interact with the symbolic information to determine the names and types of the fields of variables and to elaborate a list of all methods that can be called upon the variables, wherein the methods have no parameter and return a value.

* * * * *